US006765471B1

(12) United States Patent
Baudard et al.

(10) Patent No.: US 6,765,471 B1
(45) Date of Patent: Jul. 20, 2004

(54) DEVICE FOR IMPROVING THE SECURITY OF AN ACCESS SYSTEM EQUIPPED WITH AN IDENTIFICATION MEANS AND AN IDENTIFIER, FOR A MOTOR VEHICLE

(75) Inventors: Xavier Baudard, Paris (FR); Adham Haydar, Romainville (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/540,494

(22) Filed: Mar. 31, 2000

(30) Foreign Application Priority Data

Apr. 2, 1999 (FR) .............................................. 99 04149
Apr. 6, 1999 (FR) .............................................. 99 04242

(51) Int. Cl.$^7$ ........................ G05B 19/00; G06F 7/00; G08B 29/00; A04B 1/00; H04Q 9/00
(52) U.S. Cl. ...................................... 340/5.61; 340/5.64
(58) Field of Search ............................... 340/5.61, 5.62, 340/5.63, 5.64, 636, 426, 3.7, 3.71, 5.3, 5.31, 5.72, 7.32–7.38, 26, 825.29; 341/176, 175; 701/49

(56) References Cited

U.S. PATENT DOCUMENTS

| 4,763,121 A | * | 8/1988 | Tomoda et al. ......... 340/825.54 |
| 5,602,535 A | * | 2/1997 | Boyles et al. .......... 340/825.31 |
| 5,723,911 A | * | 3/1998 | Glehr ........................ 307/10.2 |
| 5,790,043 A | * | 8/1998 | Hettich et al. ......... 340/825.31 |
| 5,929,769 A | * | 7/1999 | Garnault ................. 340/825.31 |
| 5,969,597 A | * | 10/1999 | Weigl et al. ................. 340/426 |
| 6,002,341 A | * | 12/1999 | Ohta et al. ............. 340/825.31 |
| 6,087,987 A | * | 7/2000 | Bachhuber et al. ......... 342/457 |
| 6,130,622 A | * | 10/2000 | Hussey et al. ......... 340/825.31 |

FOREIGN PATENT DOCUMENTS

| DE | 19738323.8-51 | 2/1997 |
| DE | 19735658.3-51 | 8/1997 |
| EP | 93402710.3 | 4/1993 |

* cited by examiner

Primary Examiner—Michael Horabik
Assistant Examiner—Nam Nguyen
(74) Attorney, Agent, or Firm—Liniak, Berenato & White

(57) ABSTRACT

A device for improving the security of a "hands-free" access system for a motor vehicle, the system comprising an identification device installed on the vehicle and able to control the locking the opening leaves of the vehicle, and at least one identifier intended to be worn or carried by a user and capable of setting up a remote exchange of data with the identification device so as to control the locking means, when the identification device has authenticated the identifier, the identification means being intended, after a locking command, to send an interrogation signal into the cabin of the vehicle and receive in response a "present" signal from each identifier still present in the cabin, wherein, when a "present" signal is received by the identification device, the identification device sends into the cabin an inhibit signal which is received and stored in memory by each identifier present in the cabin.

7 Claims, 1 Drawing Sheet

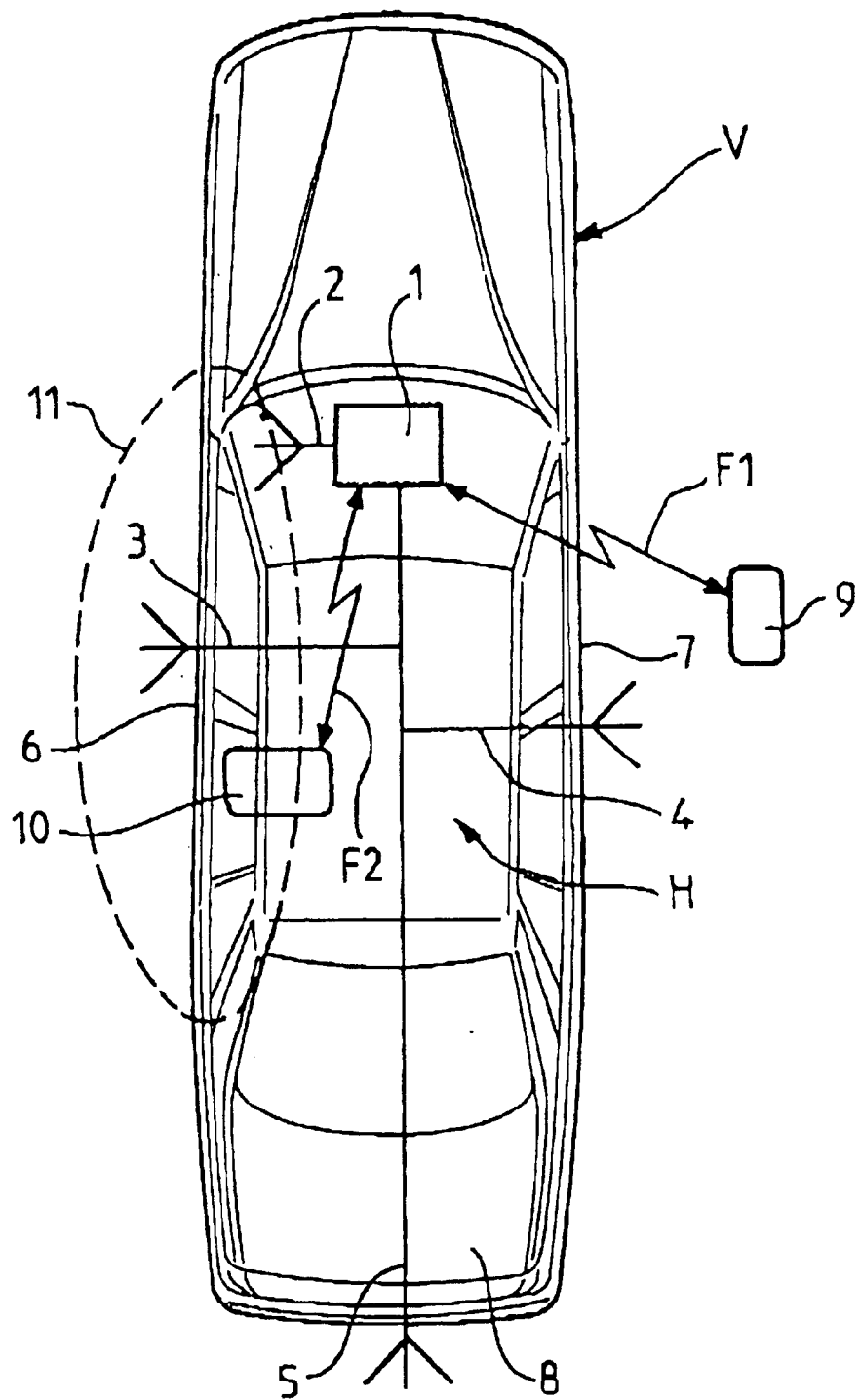

DEVICE FOR IMPROVING THE SECURITY OF AN ACCESS SYSTEM EQUIPPED WITH AN IDENTIFICATION MEANS AND AN IDENTIFIER, FOR A MOTOR VEHICLE

BACKGROUND OF THE INVENTION

1. Field of the Invention

The present invention relates to a device for improving the security of a so-called "hand-free" access system for a motor vehicle, comprising an identification means installed on the vehicle and at least one identifier worn or carried by the user.

2. Description of Related Art

In such a system, a remote exchange of data between the identification means and the identifier takes place in order to control the means for locking the opening leaves of the vehicle when the identification means have authenticated the identifier. In this type of system, in order to gain access, the user has first of all to initiate an identification operation. The operation may be started, for example, by action on a control button located on the opening leaf, or by remote control, or possibly by a presence detector installed in the cabin of the vehicle.

However, one and the same identification means is generally associated with a number of identifiers intended for a number of users, which means that it is possible that a user may leave the vehicle with an identifier, causing the vehicle to be locked, while another identifier is left in the vehicle. In such a case, if a thief breaks into the vehicle, he may take possession of the identifier left behind in the vehicle, it being possible that this identifier may allow him to start the vehicle.

Document DE-C-197 35658 describes an access control system in which a control installed in the vehicle sends out, after a command to lock, a checking signal to check whether there are still any transponders in the cabin of the vehicle, the transponders recognized as being inside the vehicle being recorded in a memory allocated to said control so that said control can block all the transponders thus recorded when the vehicle surveillance device recognizes irregular access to the vehicle.

The single figure of the appended drawing depicts a vehicle V which comprises a main electronic management unit 1 incorporating an identification means and connected to a number of antennas 2 to 5. The antenna 2 is arranged inside the cabin H of the vehicle and has an area of coverage which extends practically throughout the cabin. The antennas 3 and 4 are external to the cabin of the vehicle and located, for example, in the handles of side doors 6, 7. The antenna 5 is also external to the cabin and extends toward the rear of the vehicle, more or less in the region of the trunk lid 8. The identification means comprises a low-frequency emitter and a radio-frequency receiver to allow the exchange of data with a number of identifiers, for example the identifiers 9, 10.

In this case, assuming that the identifier 10 has been left inside the cabin H of the vehicle V when the user carrying or wearing the identifier 9 left the vehicle, the vehicle becomes locked under the control of the central unit 1 by virtue of the exchange of information with the identifier 9, as embodied by the arrow F1. The dialogue between the identifier 9 and the central unit may be initiated by the closing of a door or alternatively by a remote control button on the housing 9. In his case, in accordance with the principle of the aforementioned German document, the central unit 1 sends out a control signal, embodied by the arrow F2, into the cabin H to detect the presence of the identifier 10, and this is stored in memory in the central unit 1.

However, if somebody not wearing or carrying the authorized identifier grasps hold of the handle of a door of the vehicle, whether this be through error or malicious intent, the central unit 1 in response emits an interrogation signal which is sent outside the vehicle, particularly by the antenna 3. Given that this individual is not wearing the authorized identifier, the vehicle should not be able to be unlocked. However, as the area of coverage 11 of the antenna 3 also extends slightly to the inside of the cabin, as visible in the figure of the, appended drawing, because the doors have windows in them, it may be that the identifier 10 is in the area of coverage 11 of the antenna 3 and is thus able to respond to the central unit 1 to trigger the unlocking of the vehicle, even though no authorized user is in proximity to the vehicle. This scenario may occur when an identifier has been left, for example, in the internal compartment of a door.

SUMMARY OF THE INVENTION

The object of the invention is to eliminate the aforementioned drawback and to provide a device for improving the security of a so-called "hand-free" access system for a motor vehicle, which is simple and effective.

To this end, the subject of the invention is a device for improving the security of a so-called "hands-free" access system for a motor vehicle, said system comprising an identification means installed on the vehicle and able to control the means of locking the opening leaves of the vehicle, and at least one identifier intended to be worn or carried by a user and capable of setting up a remote exchange of data with the identification means so as to control the locking means, when the identification means has authenticated the identifier, said identification means being intended, after a locking command, to send an interrogation signal into the cabin of the vehicle and receive in response a "present" signal from each identifier still present in the cabin, wherein, when a "present" signal is received by the identification means, the latter sends into the cabin an inhibit signal which is received and stored in memory by each identifier present in the cabin.

Furthermore, when the user wearing or carrying an identifier is in the vehicle and locks the vehicle doors from the inside, for example when traveling through areas of ill-repute, it is also necessary to prevent an unauthorized person from being able to unlock the vehicle simply by actuating the exterior door handle, if the identifier worn or carried by the user is accidentally in the area of coverage of the external door antenna.

To this end, when the command to lock is given from inside the cabin of the vehicle, the identification means is intended to send out an inhibit signal to inhibit each identifier present in the cabin, only with respect to an exchange of information allowing unlocking. In other words, the identifier can still dialogue with the identification means to allow the vehicle to be started, but will no longer allow automatic unlocking. By way of example, an internal button may be provided for the central-locking of the doors, from inside the cabin.

According to yet another feature, the identification means is capable of controlling a means for preventing the vehicle from being started, and at least one identifier is capable of setting up an exchange of data with the identification means to control said start-preventing means when the identifier has been authenticated, the device being one wherein, when the command to lock has been given from outside the vehicle, the identification means is capable of sending out an inhibit signal to inhibit each identifier present in the cabin of the vehicle, with respect to the unlocking and/or the starting of the vehicle.

In a first embodiment, the interrogation signal and the inhibit signal are emitted at low frequency.

According to another feature, the "present" signal from the identifier is emitted at high frequency, or even radio frequency.

Advantageously, the interrogation signal is emitted by the identification means after the central unit of the vehicle has received confirmation that the status of the opening leaves is "locked".

According to yet another feature, after a command to unlock, the identification means is intended to send out a further interrogation signal into the cabin and receive in response a "present" signal from each identifier previously inhibited and still present in the cabin, said identification means being capable of emitting an activation signal, when a "present" signal is received, so as to erase the inhibit command in the memory of each identifier detected as being present in the cabin.

BRIEF DESCRIPTION OF THE DRAWINGS

In order to give a better understanding of the subject matter of the invention, one embodiment thereof, depicted in the appended drawing, will now be described by way of purely illustrative and nonlimiting example. This drawing comprises a single FIGURE which diagrammatically depicts, in a view from above, a motor vehicle equipped with the device according to the invention.

DETAILED DESCRIPTION OF PREFERRED EMBODIMENTS

When a user wearing or carrying the identifier 9 leaves the vehicle, leaving another identifier 10 behind in the cabin H, and closes the doors 6, 7, the central management unit 1 detects the closing of the doors and causes the identification means to emit an interrogation signal toward the identifier 9, via the external antennas 3 to 5. When the identifier 9 leaves the area of coverage of the external antennas, the identification means of the vehicle no longer receives a signal in response from the identifier 9, and this causes the vehicle to be locked.

The central unit 1 then sends out an interrogation signal inside the cabin of the vehicle, for example via the internal antenna 2. The identifier 10 located inside the cabin is "woken up" by the interrogation signal from the antenna 2 and emits a "present" signal in response, as embodied by the arrow F2. As the central unit 1 receives a signal indicating presence inside the cabin, it therefore causes the emission of an inhibit signal, for example via the internal antenna 2, which is received by the identifier 10, the latter therefore storing the inhibit command from the central unit 1 in memory. Thus, even if the identifier 10 is in the area of coverage 11 of the external antenna 3, and an unauthorized person actuates the external door handle, the identifier 10 will not be able to respond to the interrogation signal emitted by the antenna 3, because the identifier 10 will have previously been inhibited with respect to access to the vehicle.

When an authorized user wearing or carrying the identifier 9 approaches the vehicle V, a dialogue will be set up with the identification means in the central unit 1, as embodied by the arrow F1, to cause the vehicle to be unlocked.

Similarly, following the unlock command, the central unit 1 sends out an interrogation signal, followed by a signal for activating the identifier 10 detected as being present in the vehicle, to erase the inhibit command in the memory of the identifier 10.

Although the invention has been described in conjunction with one particular embodiment, it is quite obvious that it is not in any way restricted thereto and that it comprises all technical equivalents of the means described and combinations thereof where these fall within the scope of the invention.

What is claimed is:

1. A device for improving the security of a hands-free access system for a motor vehicle (V), said system comprising an identification means (1) installed on the vehicle and able to control the means of locking the opening leaves (6–8) of the vehicle, and at least one identifier (9, 10) intended to be carried by a user and capable of setting up a remote exchange of data with the identification means so as to control the locking means, when the identification means has authenticated the identifier, said identification means being intended, after a locking command, to send an interrogation signal into the cabin (H) of the vehicle and receive in response a present signal from each identifier (10) still present in the cabin, wherein, when a present signal is received by the identification means (1), the identification means sends into the cabin an inhibit signal which is received and stored in memory by each identifier (10) present in the cabin (H).

2. The device as claimed in claim 1, wherein when the command to lock is given from inside the cabin (H) of the vehicle, the identification means (1) is intended to send out an inhibit signal to inhibit each identifier (10) present in the cabin, only with respect to an exchange of information allowing unlocking, 3. The device as claimed in claim 1, in which the identification means (1) is capable of controlling a means for preventing the vehicle (V) from being started, and at least one identifier is capable of setting up an exchange of data with the identification means to control said start-preventing means when the identifier has been authenticated, wherein, when the command to lock has been given from outside the vehicle, the identification means (1) is capable of sending out an inhibit signal to inhibit each identifier (10) present in the cabin of the vehicle, with respect to the unlocking and/or the starting of the vehicle.

4. The device as claimed in claim 3, wherein the interrogation signal and the inhibit signal are emitted at low frequency.

5. The device as claimed in claim 4, wherein the "present" signal from the identifier is emitted at high frequency, or even radio frequency.

6. The device as claimed in claim 5, wherein the interrogation signal is emitted by the identification means (1) after the central unit of the vehicle (V) has received confirmation that the status of the opening leaves (6–8) is locked.

7. The device as claimed in claim 6, wherein after a command to unlock, the identification means (1) is intended to send out a further interrogation signal into the cabin (H) and receive in response a present signal from each identifier (10) previously inhibited and still present in the cabin, said identification means being capable of emitting an activation signal, when a present signal is received, so as to erase the inhibit command in the memory of each identifier detected as being present in the cabin.

* * * * *